United States Patent Office 3,501,473
Patented Mar. 17, 1970

3,501,473
DISUBSTITUTED - 11H - QUINAZOLINO - [2,3-b] QUINAZOLINE - 11,13(5H) - DIONES AND THE PROCESS FOR THEIR PREPARATION
Stanley C. Bell, Narberth, Pa., assignor to American Home Products Corporation, New York, N.Y., a corporation of Delaware
No Drawing. Filed Nov. 9, 1967, Ser. No. 681,885
Int. Cl. C07d 51/48; A61k 27/00
U.S. Cl. 260—256.4                     5 Claims

ABSTRACT OF THE DISCLOSURE

This invention is concerned with disubstituted-11H-quinazoline-[2,3-b]quinazoline-11,13(5H) diones which are pharmacologically active as central nervous system depressants. Further, this invention is concerned with a one step process for the preparation of these compounds by the interaction of an anthranilamide and thiophosgene.

---

This invention relates to new and novel disubstituted tetracyclic compounds and the process for the preparation thereof. In particular, this invention is concerned with disubstituted - 11H - quinazolino - [2,3 - b]quinazoline-11,13(5H) diones which have central nervous system depressant properties when tested under standard and acceptable pharmacological procedures. They are, therefore, deemed to possess utility in experimental and comparative pharmacology.

The new and novel tetracyclic compounds encompassed within the scope of the present invention are depicted by the following formula:

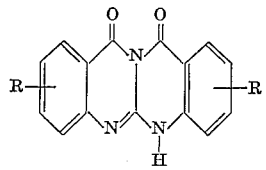

wherein both R's are the same and selected from the group consisting of halogen, lower alkyl and lower alkoxy. The terms "lower alkyl" and "lower alkoxy" as employed herein are meant to include both branched and straight chain moieties containing from about one to about eight carbon atoms. Typical examples of the compounds of this invention are: 2,9-dichloro-11H-quinazolino [2,3-b]quinazoline-11,13(5H)-dione; 3,8 - dimethyl-11H-quinazolino[2,3-b]quinazoline-11,13(5H)-dione; and 2,9-dimethoxy - 11H - quinazolino[2,3 - b]quinazoline-11,13-(5H)-dione.

These tetracyclic compounds of the present invention are prepared by the new and novel process which is hereinafter schematically depicted:

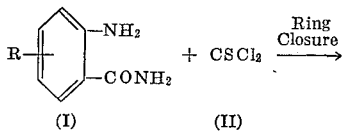

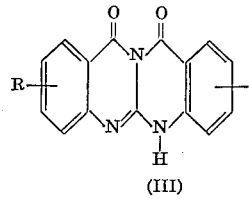

wherein R is defined as above. This reaction is effected by admixing an appropriate anthranilamide (I) with a slight molar excess of thiophosgene (II) in a reaction-inert organic solvent at about reflux temperatures for a period of from about one to about five hours. Preferably this reaction is conducted in dioxane at reflux temperatures for about two hours.

When the ring closure is complete, the resulting disubstituted-11H-quinazolino - [2,3 - b]quinazoline - 11,13(5H)-dione (III) is separated by standard recovery procedures. For example, the reaction mixture is filtered and the solid product (III) recrystallized from a suitable solvent, e.g. dimethylformamide, an alkanol or methyl Cellosolve.

Many of the anthranilamide reactants employed in the processes of this invention are known compounds which are readily available from commercial sources, while the remainder can easily be prepared in accordance with standard organic procedures well known to those skilled in the art. As employed above, the term "reaction-inert organic solvent" is meant to include any organic solvent which will dissolve the reactants and not react with the thiophosgene. Many such reactants will readily suggest themselves to one skilled in the art of chemistry, for example, dioxane, ether, dimethoxyethane, dimethylformamide, liquid alkanes and tetrahydrofuran.

The new and novel tetracyclic compounds of the present invention possess valuable pharmacological activity. In particular, these compounds in standard pharmacological procedures demonstrate nervous system activity and are useful as depressants. Because of this property they are of importance in experimental and comparative pharmacology.

In the pharmacological evaluation of the central nervous system depressant compounds of this invention the in vivo effects of the compounds of this invention are tested as follows:

The compound is administered interaperitoneally to three mice (14 to 24 grams) at each of the following doses: 400, 127, 40 and 12.7 mg./kg. The animals are watched for a minimum of two hours during which time signs of general stimulation (i.e., increased spontaneous motor activity, hyperactivity on tactile stimulation, twitching), general depression (i.e., decreased spontaneous motor activity, decreased respiration) and autonomic activity (i.e., miosis mydriasis, diarrhea) are noted. The animals are tested for changes in reflexes (i.e. flexor, extensor) and are rated by use of a pole climb and inclined screen for the presence of sedation-ataxia. The "Eddy hot-plate method" [Nathan B. Eddy and Dorothy Leimbach, J. Parmacol. Exper. Therap. 107, 385 (1953)] is used to test for analgesia. The experiment is terminated by subjecting each animal to a maximal electroshock to test for anti-convulsant activity.

The new and novel tetracyclic compounds of this invention in the above test procedure induce decreased motor activity; sedative-ataxic effects; and decreased respiration at 127 mg./kg.

The following examples are given by way of illustration and are not to be construed as limitations of this invention, many variations of which are possible without departing from the scope and spirit thereof.

EXAMPLE I

To a solution of 34.1 g. (0.20 M) of 5-chloroanthranilamide in 200 ml. of dioxane, there is added a solution of 25.3 g. (0.22 M) of thiophosgene in 200 ml. of dioxane and the reaction mixture is refluxed for two hours. After cooling there is filtered off 12.3 g. of yellow solid which on recrystallization from dimethylformamide affords 2,9-dichloro - 11H-quinazolino[2,3-b]quinazoline-11,13(5H)-dione, M.P. 335–340° C.

*Analysis.*—Calcd. for $C_{15}H_7Cl_2N_3O_2$ (percent): C, 54.24; H, 2.13; N, 12.65; Cl, 21.35. Found (percent): C, 54.40; H, 2.12; N, 12.82; Cl, 21.13.

In a similar manner, 4-bromoanthranilamide is reacted with thiophosgene to afford 3,8-dibromo-11H-quinazolino[2,3-b]quinazoline-11,13-(5H)-dione.

EXAMPLE II

To a solution of 4-methylanthranilamide (0.10 M) in 100 ml. of ether, there is added a solution of thiophosgene (0.11 M) in 100 ml. of ether and the reaction mixture is refluxed for five hours. After cooling, the solid is separated by filtration and recrystallized from methyl Cellosolve to afford 3,8-dimethyl - 11H - quinazolino[2,3-b]quinazoline-11,13(5H)-dione.

Similarly 5-ethylanthranilamide is reacted with thiophosgene to produce 2,9-diethyl-11H-quinazolino[2,3-b]quinazoline-11,13(5H)-dione.

EXAMPLE III

To a solution of 0.20 M of 5-methoxyanthranilamide in 200 ml. of tetrahydrofuran, there is added a solution of 0.22 M of thiophosgene in 200 ml. of tetrahydrofuran and the reaction mixture is refluxed for one hour. After cooling a solid is filtered off which on recrystallization from dimethylformamide affords 2,9 - dimethoxy-11H-quinazolino[2,3-b]quinazoline-11,13(5H)-dione.

In like manner, 4,7-dipropoxy-11H-quinazolino[2,3-b]quinazoline-11,13(5H)-dione is produced.

EXAMPLE IV

Repeating the procedure of Examples I–III to react an appropriate anthranilamide with thiophosgene, the following compounds are obtained:

2,9-difluoro-11H-quinazolino[2,3-b]quinazoline-11,13(5H)-dione;
3,8-dipropyl-11H-quinazolino[2,3-b]quinazoline-11,13(5H)-dione;
2,9-diethoxy-11H-quinazolino[2,3-b]quinazoline-11,13(5H)-dione; and
2,9-dibutyl-11H-quinazolino[2,3-b]quinazoline-11,13(5H)-dione.

What is claimed is:
1. A compound selected from the group consisting of those having the formula:

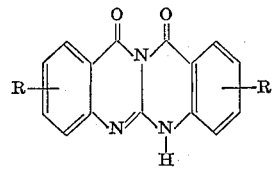

wherein both R's are the same and selected from the group consisting of halogen, and lower alkoxy.

2. A compound as described in claim 1 which is: 2,9-dichloro - 11H-quinazolino[2,3-b]quinazoline-11,13(5H)-dione.

3. A compound as described in claim 1 which is: 2,9-dimethoxy - 11H - quinazolino[2,3-b]quinazoline - 11,13(5H)-dione.

4. A process for the preparation of compounds having the formula:

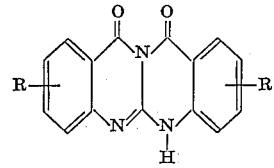

wherein both R's are the same and selected from the group consisting of halogen, lower alkyl and lower alkoxy; which comprises contacting an anthranilamide having the formula:

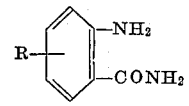

wherein R is defined as above, with thiophosgene in a reaction-inert organic solvent at about reflux temperatures for a period of about one to about five hours.

5. A process as described in claim 4 wherein the reaction-inert organic solvent is dioxane.

References Cited

Butler et al., Chem. Abstracts, 53:21995–7 (1959).

ALTON D. ROLLINS, Primary Examiner

R. J. GALLAGHER, Assistant Examiner

U.S. Cl. X.R.

260—558, 559; 424—251